US012338187B2

(12) United States Patent
Branigan et al.

(10) Patent No.: US 12,338,187 B2
(45) Date of Patent: Jun. 24, 2025

(54) MULTI-COMPONENT DEVICE AND METHOD OF MAKING A MULTI-COMPONENT DEVICE

(71) Applicant: II-VI Delaware, Inc., Wilmington, DE (US)

(72) Inventors: Kyle Branigan, Wilmington, DE (US); Mike Aghajanian, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 79 days.

(21) Appl. No.: 18/155,546

(22) Filed: Jan. 17, 2023

(65) Prior Publication Data
US 2024/0239715 A1    Jul. 18, 2024

(51) Int. Cl.
*C04B 41/45* (2006.01)
*C04B 41/50* (2006.01)
(Continued)

(52) U.S. Cl.
CPC ...... *C04B 41/4531* (2013.01); *C04B 41/5059* (2013.01); *G02B 5/0833* (2013.01);
(Continued)

(58) Field of Classification Search
CPC ............ C04B 41/4531; C04B 41/5059; C04B 2235/9607; C04B 2235/9646; G02B 5/0833; G02B 5/22; G02B 2207/107
See application file for complete search history.

(56) References Cited

U.S. PATENT DOCUMENTS

| 6,551,176 B1 | 4/2003 | Garretson |
| 9,469,918 B2 | 10/2016 | Xu et al. |

(Continued)

FOREIGN PATENT DOCUMENTS

| DE | 102007063517 B3 | 1/2009 |
| EP | 1767312 A1 | 3/2007 |

(Continued)

OTHER PUBLICATIONS

"Chemical bonding: Reaction bonded silicon carbide, Encyclopedia Brittanica,", https://www.britannica.com/technology/advanced-ceramics/Chemical-bonding#ref609309 accessed Sep. 15, 2023. (Year: 2023)DE102007063517B3.

(Continued)

*Primary Examiner* — Michael G Miller
(74) *Attorney, Agent, or Firm* — Blank Rome LLP

(57) ABSTRACT

A device includes a ceramic substrate formed of a first material, a polishable layer formed of a different material, and an interface between the ceramic substrate and the polishable layer. The interface is formed by infiltration of molten elemental silicon, and bonds the ceramic substrate and the polishable layer together. The device may include an optical device such as, for example, mirror or a beam dump. A method of making a device from a green-state structure and a polishable layer is also disclosed. The method includes infiltrating elemental silicon into and through the green-state structure, to form a substrate of a multi-phase ceramic material from the green-state structure, and to reactively bond the substrate and the polishable layer together.

18 Claims, 5 Drawing Sheets

(51) Int. Cl.
*G02B 5/08* (2006.01)
*G02B 5/22* (2006.01)

(52) U.S. Cl.
CPC ........ *G02B 5/22* (2013.01); *C04B 2235/9607* (2013.01); *C04B 2235/9646* (2013.01); *G02B 2207/107* (2013.01)

(56) References Cited

U.S. PATENT DOCUMENTS

| | | | |
|---|---|---|---|
| 2005/0203630 | A1 | 9/2005 | Pope et al. |
| 2007/0051354 | A1 | 3/2007 | Sung |
| 2011/0221084 | A1* | 9/2011 | Goodman ............. C04B 35/571 264/29.5 |
| 2014/0109756 | A1 | 4/2014 | Aghjanian et al. |
| 2017/0291279 | A1 | 10/2017 | Karandikar et al. |
| 2017/0313627 | A1 | 11/2017 | Shim et al. |
| 2018/0099379 | A1 | 4/2018 | Mastrobattisto et al. |
| 2019/0369308 | A1 | 12/2019 | Carrigan |
| 2021/0002534 | A1 | 1/2021 | Matthey et al. |
| 2021/0179498 | A1 | 6/2021 | Katsikis et al. |
| 2021/0331985 | A1 | 10/2021 | Salamone et al. |
| 2022/0227676 | A1 | 7/2022 | Coppola et al. |
| 2023/0373871 | A1 | 11/2023 | Wang et al. |

FOREIGN PATENT DOCUMENTS

| | | |
|---|---|---|
| EP | 2924506 A2 | 9/2015 |
| JP | H05335529 A | 12/1993 |
| JP | 2006501073 A | 1/2006 |
| JP | 2019513564 A | 5/2019 |
| KR | 101552337 B1 | 9/2015 |
| WO | 2004028746 A2 | 4/2004 |
| WO | 2019175333 A1 | 9/2019 |

OTHER PUBLICATIONS

"Japanese Office Action issued Jun. 29, 2022 and English translation".

Aghajanian, et al., "A New Family of Reaction Bonded Ceramics for Armor Applications", Pac Rim 4, Nov. 4-8, 2001, Paper No. PACB-H-04-2001.

Salamone, et al., "Effects of Si:SiC Ratio and SiC Grain Size on Properties of RbSc Ceramic", Engineering and Science Proceedings, vol. 28, No. 2, (2007) 101-109.

Luo, Zhaohua, et al., "Development of SiC—SiC Joint by Reaction Bonding Method Using SiC/C Tapes as the Interlayer", Journal of the European Ceramic Society, 2012; 32:3819-3824 (XP028427001).

Shi-Bin, Li, et al., "Reaction Forming of Joints in Silicon Carbide Ceramic Materials", Materials Science and Engineering A, 2008, 483-484:747-750 (XP022619350).

Patel, et al., KR101552337B1, Sep. 10, 2015 (machine translation) (Year 2015).

* cited by examiner

MULTI-COMPONENT DEVICE AND METHOD OF MAKING A MULTI-COMPONENT DEVICE

BACKGROUND

Reaction-bonded silicon-carbide (RB-SiC, or Si/SiC) is a multi-phase material formed by reactive infiltration in which molten elemental silicon (Si) is brought into contact with a porous mass of interconnected silicon-carbide (SiC) particles plus carbon (C) in a vacuum or inert atmosphere. A wetting condition is created such that the molten silicon is pulled by capillary action into the mass of interconnected silicon-carbide particles and carbon, and the silicon reacts with the carbon in the mass to form additional silicon carbide. The resulting RB-SiC material contains primarily silicon carbide, but also unreacted, interconnected silicon.

The infiltration process is illustrated in FIGS. 1 and 2. FIG. 1 is a schematic cross-sectional view of the porous mass 20 which contains interconnected silicon-carbide particles 22 and carbon 24. FIG. 2 is a schematic cross-sectional view of the RB-SiC material (a ceramic material) 26 after infiltration by molten silicon, and subsequent cooling. The infiltration may occur in a vacuum or inert atmosphere.

In the illustrated process, molten silicon reactively infiltrates into the porous mass 20 (FIG. 1) such that the RB-SiC material 26 (FIG. 2) has a microstructure of three elements: (1) the original silicon-carbide particles 22; (2) reaction-formed silicon-carbide (Si+C=>SiC) 28, and (3) residual (unreacted) elemental silicon 30. The silicon 30 expands as it solidifies from its liquid state such that the reacted, solidified three-component microstructure 22, 28, 30 is fully dense.

Thus, as the term is used herein, RB-SiC material is a fully dense, two-phase composite of silicon-carbide particles in a continuous silicon matrix.

RB-SiC material is mentioned in U.S. patent application Ser. No. 17/663,956 (filed May 18, 2022) and United States Patent Publications Nos. 2022/0227676 (published Jul. 21, 2022) and 2021/0331985 (published Oct. 28, 2021). The entire disclosures of U.S. patent application Ser. No. 17/663,956 and United States Patent Publications Nos. 2022/0227676 and 2021/0331985 are incorporated herein, in their entireties, by reference.

SUMMARY

The present disclosure relates to a multi-component device formed of a ceramic substrate bonded to a polishable layer, where the ceramic substrate and the polishable layer are formed of different materials. According to this aspect of the present disclosure, an interface is located between the ceramic substrate and the polishable layer, the interface bonds the ceramic substrate and the polishable layer together, and the interface is formed by infiltrating molten elemental silicon into and through a preform for the ceramic substrate.

According to another aspect of the present disclosure, the ceramic substrate is formed of a multi-phase material such as reaction-bonded silicon-carbide (RB-SiC). According to yet another aspect of the present disclosure, the polishable layer includes a polishable ceramic material such as chemical-vapor-deposited silicon-carbide (CVD-SiC) or single-crystal silicon-carbide (Xtal-SiC). The materials of the substrate and the polishable layer may be selected so that the substrate and the polishable layer have well-matched coefficients of thermal expansion (CTEs) across a wide range of temperatures. The substrate and the polishable layer may be considered to have well-matched CTEs when the difference in CTE between the substrate and the polishable layer is, for example, less than 2.0 ppm/° C., or less than 0.2 ppm/° C.

The present disclosure also relates to an optical device formed from a multi-component device, where the multi-component device includes a ceramic substrate bonded to a polishable layer, and the ceramic substrate and the polishable layer are formed of different materials. According to this aspect of the present disclosure, an interface is located between the substrate and the polishable layer. The interface bonds the substrate and the polishable layer together, and is formed by infiltrating elemental silicon, and the polishable layer has a polishable surface, facing away from the substrate. The polishable layer may be polished to reflect light.

The present disclosure also relates to a multi-component device which includes a light-absorbing beam dump. According to this aspect of the disclosure, the multi-component device includes a ceramic substrate bonded to a polishable layer, the ceramic substrate and the polishable layer are formed of different materials, and an interface is located between the substrate and the polishable layer. The interface bonds the substrate and the polishable layer together, and is formed by infiltrating elemental silicon, and the polishable surface faces away from the substrate.

The present disclosure also relates to a method of making a multi-component device, which includes the steps of: (1) providing a green-state structure and a polishable layer, wherein the green-state structure includes a porous mass of interconnected silicon-carbide and carbon; and (2) infiltrating elemental silicon into and through the green-state structure to form a substrate of a multi-phase ceramic material, and to bond the substrate and the polishable layer together. According to one aspect of the present disclosure, the substrate formed from the green-state structure includes a multi-phase material, and the polishable layer does not include reaction-bonded silicon-carbide.

If desired, the method of making the multi-component device includes the step of extracting a mirror from the bonded substrate and polishable layer. The extracting step may include wire electrical-discharge-machining (EDM).

The present disclosure also relates to a method of making a multi-component device. This method includes the steps of providing a porous mass of silicon carbide and carbon, causing molten elemental silicon to infiltrate the porous mass to form a multi-phase RB-SiC material, causing the molten silicon to flow though the porous mass and into contact with an unpolished surface of a polishable layer, and thereby bonding the polishable layer to the RB-SiC material. The polishable layer may be polished to a suitable finish before or after the bonding process. The polishable layer may provide a secondary face material for the multi-component device.

The present disclosure also relates to a method of reaction bonding bulk CVD-SiC or Xtal-SiC to a RB-SiC substrate.

BRIEF DESCRIPTION OF THE DRAWINGS

Throughout the drawings, like elements are designated by like reference numerals and other characters. The drawings show non-limiting examples for purposes of illustration and explanation of the present disclosure, and are not drawn to scale.

DETAILED DESCRIPTION

Figure 3:
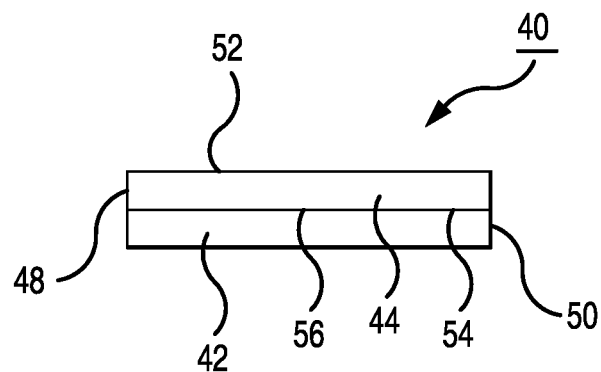
FIG. 3 is a side view of an example of a multi-component device constructed in accordance with the present disclosure.

Referring now to the drawings, FIG. 3 shows an example of a multi-component, combined structure 40 constructed in accordance with the present disclosure. The multi-component structure 40 includes a substrate 42 (an example of a first component) and a polishable layer 44 (an example of a second component). The substrate 42 may be a layer (as illustrated in FIG. 3) or may have some other, suitable shape.

If desired, the multi-component structure 40 may have more than two components. The periphery 48 of the polishable layer 44 is not necessarily coextensive with the periphery 50 of the substrate 42. The present disclosure should not be limited to features shown in the drawings except to the extent such features are recited in the appended claims.

Figure 2:
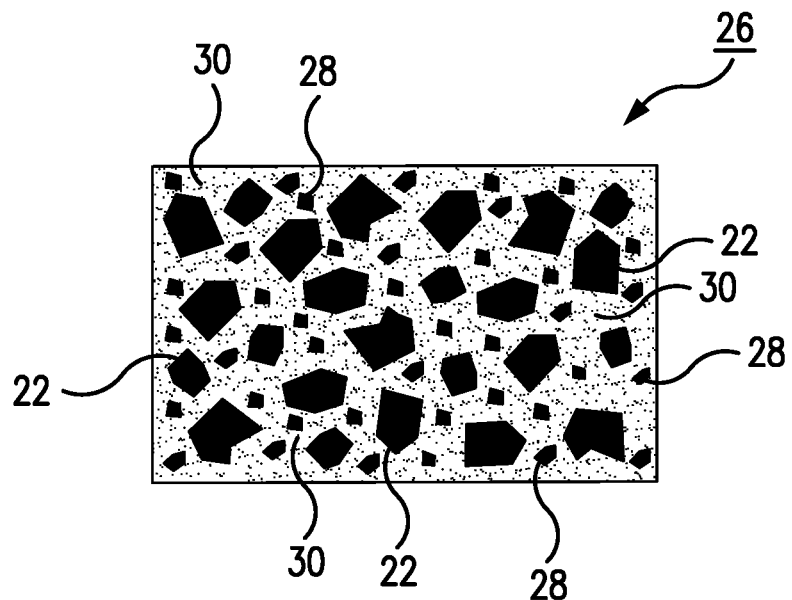
FIG. 2 is a schematic cross-sectional view of a reaction-bonded silicon-carbide (RB-SiC) material made from the porous mass of FIG. 1.

The substrate 42 is formed of the RB-SiC material 26 illustrated in FIG. 2. That is, the substrate 42 (FIG. 3) includes a fully dense, three-component microstructure including original silicon-carbide particles 22 (FIG. 2), reaction-bonded silicon carbide 28, and residual (unreacted) elemental silicon 30.

The polishable layer 44 is formed of a suitable polishable material and does not include RB-SiC. The polishable layer 44 may include chemical-vapor-deposited silicon-carbide (CVD-SiC), single-crystal silicon-carbide (Xtal-SiC), or another suitable material or materials. The material of the polishable layer 44 may be selected so that polishable layer 44 has a good coefficient of thermal expansion (CTE) match to the substrate 42 across a wide range of temperatures. According to one aspect of the present disclosure, the difference in CTE between the substrate 42 and the polishable layer 44 is preferably less than 2.0 ppm/° C., and even more preferably less than 0.2 ppm/° C. As used herein, the phrase "a wide range of temperatures" means "a range of temperatures between ambient and the melting point of silicon." The polishable layer 44 has a polishable surface 52. If desired, the surface 52 is polished to an extremely high dimensional accuracy and an extremely low roughness.

The polishable layer 44 may be formed in a chemical-vapor-deposition process, a single-crystal formation process, or another suitable process. According to one aspect of the present disclosure, the material of the polishable layer 44 has only one phase. In contrast to the substrate 42, the polishable layer 44 is not formed of a multi-phase material. As a result, it is easier to accurately polish the polishable surface 52 than it would be to accurately polish a surface of the substrate 42. If desired, the polishable layer 44 is formed and subjected to a suitable polishing process independently of (before or after) the infiltration process by which the substrate 42 is formed.

Figure 1:
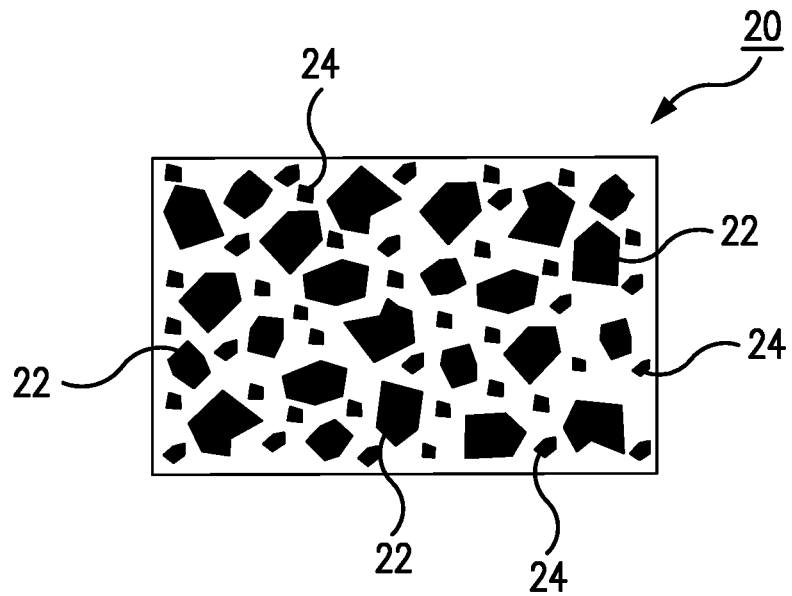
FIG. 1 is a schematic cross-sectional view of an example of a porous mass constructed in accordance with the present disclosure.
Figure 4:
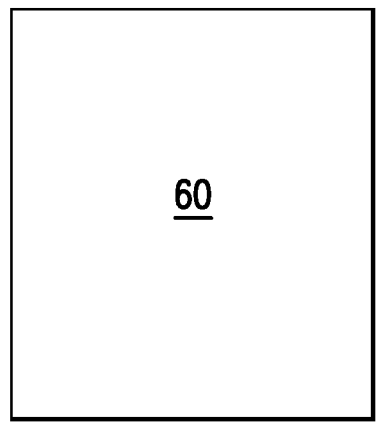
FIG. 4 is a top view of an example of a green-state structure constructed in accordance with the present disclosure.
Figure 5:
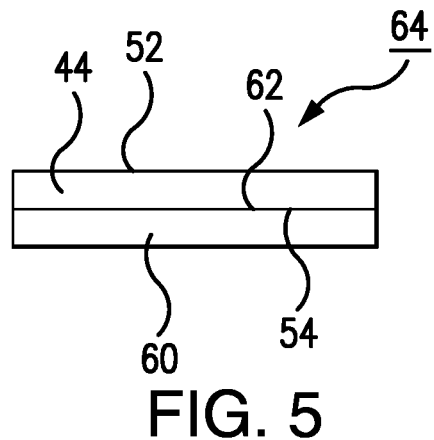
FIG. 5 is a side view of an example of a combined preform including the green-state structure of FIG. 4 and secondary face material, the latter being an example of a polishable layer constructed in accordance with the present disclosure.
Figure 6:
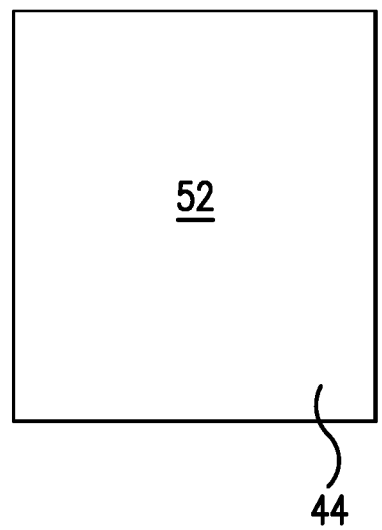
FIG. 6 is a top view of the secondary face material/polishable layer of FIG. 5.
Figure 7:
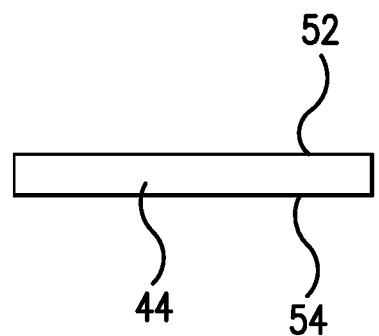
FIG. 7 is a side view of the polishable layer of FIG. 5, before the layer is combined with the green-state structure illustrated in FIGS. 4 and 5.

A green-state structure 60 for use in forming the substrate 42 is illustrated in FIGS. 4 and 5. The green-state structure 60 includes the same porous interconnected material as that of the porous mass 20 shown in FIG. 1. That is, the green-state structure 60 (FIGS. 4 and 5) includes interconnected silicon-carbide particles 22 (FIG. 1) and carbon 24.

The interconnected material of the green-state structure 60 (FIGS. 4 and 5) may be sufficiently cohesive and strong to permit movement and handling without degrading edges and surfaces of the green-state structure 60. The cohesiveness and strength of the interconnected green-state structure 60 may be established during the casting of the silicon-carbide particles 22 (FIG. 1) and carbon 24.

In operation, an unpolished surface 54 of the polishable layer 44 and a first surface 62 (also unpolished) of the green-state structure 60 are brought into contact with each other to form the preform 64 illustrated in FIG. 5. If desired, the green-state structure 60 may be cast onto the second surface 54 of the polishable layer 44. Then, molten elemental silicon (not illustrated in FIGS. 4 and 5) infiltrates into the green-state structure 60, within a vacuum or inert atmosphere, to produce the substrate 42. The infiltration process is essentially the same as the one used to produce the RB-SiC material illustrated in FIG. 2.

According to the present disclosure, however, the infiltration process which completes the formation of the substrate 42 may be continued such that some of the molten silicon exudes outwardly through the contacting surface 62, fills interstices between the contacting surface 62 and the unpolished surface 54 of the polishable layer 44, comes into contact with the unpolished surface 54, and forms an interface 56 by reacting with silicon carbide in the polishable layer 44 to thereby securely bond the substrate 42 and the polishable layer 44 together.

After the infiltration process is completed, that is, after the combined structure 40 (FIG. 3) is formed, individual parts 80 (FIG. 10) may be extracted from the combined structure 40 using wire electrical-discharge-machining (EDM), spark machining, spark eroding, die sinking, wire burning, wire erosion, or another suitable process. The parts 80 may be employed as optical mirrors, beam dumps, or other optical devices. Surfaces 81 of the extracted parts 80 are formed of the polishable layer 44. The surfaces 81 face away from the substrate 42 and do not contain any RB-SiC. The surfaces 81 may be polished after the substrate 42 is bonded to the polishable layer 44.

Figure 8:
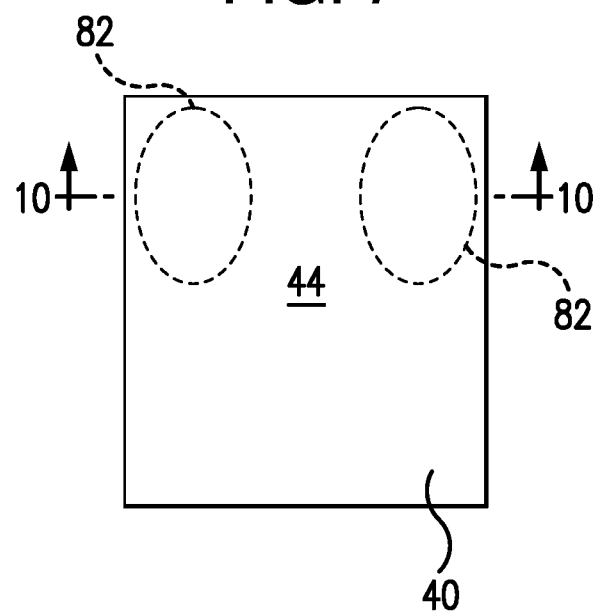
FIG. 8 is a top view of the multi-component device of FIG. 3.
Figure 9:
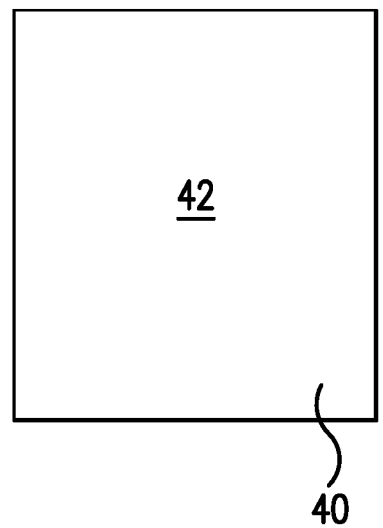
FIG. 9 is a bottom view of the multi-component device of FIGS. 3 and 8.

The peripheries 82 of the extracted parts 80, where the combined structure 40 is machined to extract the parts 80, are designated in FIG. 8 by dotted lines. If desired, the extracted parts 80 may have peripheries and configurations different from the ones illustrated in FIGS. 8 and 10. As noted above, the present disclosure should not be limited to features shown in the drawings except to the extent such features are recited in the appended claims.

The processes described herein may be used to overcome or alleviate difficulties associated with creating an optical quality surface on an RB-SiC material. Such difficulties may be created, at least in part, by the multi-phase nature of RB-SiC. Different Young's moduli, yield strengths, hardnesses, and chemical reactivities of the different phases may make it difficult or impossible to polish RB-SiC to a desired, high degree of smoothness. In contrast to RB-SiC, chemical-vapor-deposited silicon-carbide (CVD-SiC) and single-crystal silicon-carbide (Xtal-SiC) can be polished with extremely high dimensional accuracy and extremely low roughness.

CVD-SiC, Xtal-SiC, and certain other single-phase, polishable ceramic materials, can be grown only in a limited number of shapes, which makes it difficult or impossible to use such materials in certain optical devices. RB-SiC, in contrast, can be configured in almost any shape through green-state machining, net-shape preform casting of the ceramic, or another suitable process, followed by an infiltration process. By combining a solid piece of single-phase, easily polishable material, such as CVD-SiC or Xtal-SiC, with a body of RB-SiC, one or more extremely high-quality mirrors 81 with independently shaped support structures can be produced.

Moreover, it may difficult or impossible to form a high-quality mirror, with properties equivalent to the polishable layer 44 of the present disclosure, by depositing a CVD-SiC coating on a RB-SiC substrate. Such a directly deposited coating may be too thin, irregular, or internally stressed to be acceptable. Moreover, additional operational time may be required to level the directly deposited coating, and production yield may be adversely impacted if the irregularity of the coating were to cause the polishing operation to break through the coated surface to the underlying RB-SiC material. Additionally, a direct-deposition process may result in the formation of unwanted deposits on one or more non-optical surfaces.

The present disclosure overcomes many or all of these potential challenges by bonding a bulk piece of a material other than RB-SiC, such as CVD-SiC or Xtal-SiC, to an RB-SiC body 42 during an RB-SiC infiltration process. By casting a green-body ceramic 60 on a piece of CVD-SiC or Xtal-SiC, the crystalline SiC in the polishable layer 44 can bond to the ceramic RB-SiC during the infiltration process. If desired, the processes described above may be combined with RB-SiC to RB-SiC bonding methods to create more complex geometries like internal cooling channels (not illustrated).

If desired, the present disclosure may be implemented in connection with other ceramic substrates that are compatible with a reaction-bonding infiltration process. The RB-SiC substrate 42 illustrated in FIG. 3 is a non-limiting example of such ceramic substrates. The polishable surface 44 may be formed of any suitable material, other than the multi-phase material of the substrate, including, but not limited to, aluminum nitride (AlN), diamond, or a single-crystal silicon-carbide of any suitable allotrope or crystallographic orientation.

Figure 10:
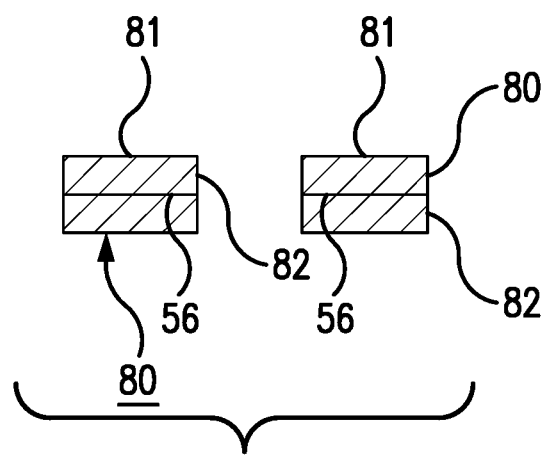
FIG. 10 is a cross-sectional view of examples of parts removed from the multi-component device of FIGS. 3, 8 and 9, taken along line 10-10 of FIG. 8.
Figure 11:
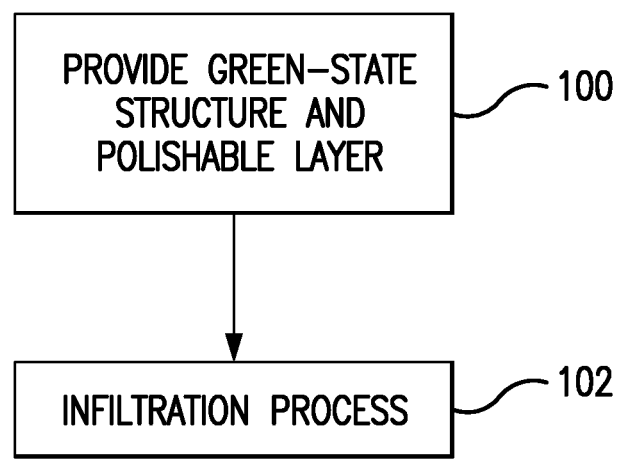
FIG. 11 is a flow chart for an example of a method of making the parts illustrated in FIG. 10.

A method of producing the parts 80 illustrated in FIG. 10 is illustrated in FIG. 11. The method includes a step 100 of providing a green-state structure 60 and a polishable layer 44, and a subsequent step 102 of infiltrating elemental silicon into and through the green-state structure 60. In the illustrated method, the green-state structure 60 is preferably a porous mass of interconnected silicon-carbide plus carbon and is configured to receive molten elemental silicon by capillary action during the infiltrating step 102.

As a result of the infiltrating step 102, a substrate of fully dense, two-phase ceramic material is formed in place of the green-state structure, and an interface is formed by a reaction between the silicon and the material of the polishable layer, which interface bonds the substrate and the polishable layer together.

The processes described herein may be employed to produce a thick, uniform, face sheet of silicon carbide (or another suitable, polishable material) without any chemical-vapor-deposition occurring outside of optical area(s). Additionally, the processes described herein may have a relatively small number of process steps, and may be performed in an efficient and uncomplicated manner.

What is claimed as new and desired to be protected by Letters Patent of the United States is:

1. A multi-component device, comprising:
   a ceramic substrate formed of a multi-phase first material comprising silicon carbide particles, reaction-bonded silicon carbide, and residual elemental silicon;
   a single-phase polishable layer formed of a second material different from the first material, and wherein the polishable layer and the ceramic substrate have well-matched coefficients of thermal expansion (CTEs); and
   an interface bonding the ceramic substrate and the single-phase polishable layer together, being formed by infiltrating elemental silicon.

2. The multi-component device of claim 1, wherein the ceramic substrate includes reaction-bonded silicon-carbide (RB-SiC).

3. The multi-component device of claim 1, wherein the polishable layer includes chemical-vapor-deposited silicon carbide (CVD-SiC).

4. The multi-component device of claim 1, wherein the polishable layer includes single-crystal silicon-carbide (Xtal-SiC).

5. An optical device, comprising the multi-component device of claim 1, wherein the polishable layer has a polishable surface facing away from the ceramic substrate.

6. The optical device of claim 5, wherein the polishable surface is polished to reflect light.

7. The optical device of claim 5, wherein the optical device includes a light-absorbing beam dump.

8. The optical device of claim 5, wherein the ceramic substrate includes reaction-bonded silicon-carbide (RB-SiC).

9. The optical device of claim 8, wherein the polishable layer includes chemical-vapor-deposited silicon carbide (CVD-SiC).

10. The optical device of claim 8, wherein the polishable layer includes single-crystal silicon-carbide (Xtal-SiC).

11. The multicomponent device of claim 1, wherein the difference in CTE between the polishable layer and ceramic substrate is less than 2.0 ppm/° C.

12. The multicomponent device of claim 1, wherein the difference in CTE between the polishable layer and ceramic substrate is less than 0.2 ppm/° C.

13. The multicomponent device of claim 1, wherein the polishable layer is made of aluminum nitride (AlN), diamond, or a single crystal silicon carbide of any suitable allotrope or crystallographic orientation.

14. The multicomponent device of claim 1, wherein the substrate is formed from a green-state structure.

15. The multicomponent device of claim 14, wherein the green-state structure comprises pores.

16. The multicomponent device of claim 1, wherein the elemental silicon bonds the substrate and the polishable layer together.

17. The multicomponent device of claim 1, wherein the interface comprises reaction-boded silicon-carbide bonding the ceramic substrate and the polishable layer together.

18. The multicomponent device of claim 1, wherein the polishable layer is reaction bonded to the ceramic substrate.

* * * * *